US011059464B2

(12) United States Patent
Strehle et al.

(10) Patent No.: US 11,059,464 B2
(45) Date of Patent: Jul. 13, 2021

(54) METHOD FOR CONTROLLING A HYDRAULIC BRAKING SYSTEM IN A VEHICLE

(71) Applicant: Robert Bosch GmbH, Stuttgart (DE)

(72) Inventors: Alfred Strehle, Fellbach (DE); Mirko Brand, Grossbottwar (DE); Thomas Schmidt, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 16/469,441

(22) PCT Filed: Oct. 10, 2017

(86) PCT No.: PCT/EP2017/075736
§ 371 (c)(1),
(2) Date: Jun. 13, 2019

(87) PCT Pub. No.: WO2018/108351
PCT Pub. Date: Jun. 21, 2018

(65) Prior Publication Data
US 2020/0001843 A1 Jan. 2, 2020

(30) Foreign Application Priority Data
Dec. 14, 2016 (DE) .......................... 102016224896.0

(51) Int. Cl.
| | | |
|---|---|---|
| *B60T 8/40* | (2006.01) | |
| *B60T 8/1766* | (2006.01) | |
| *B60T 13/14* | (2006.01) | |
| *B60T 13/66* | (2006.01) | |
| *B60T 13/68* | (2006.01) | |

(52) U.S. Cl.
CPC .............. *B60T 8/40* (2013.01); *B60T 8/1766* (2013.01); *B60T 13/146* (2013.01); *B60T 13/662* (2013.01); *B60T 13/686* (2013.01); *B60T 2201/03* (2013.01)

(58) Field of Classification Search
CPC . B60T 8/40; B60T 8/885; B60T 7/042; B60T 8/1766; B60T 2270/402; B60T 13/662; B60T 13/686; B60T 13/146; B60T 2201/03
USPC ....... 303/122.03, 3, 10, 15, 20, 122, 122.01, 303/122.05, 151
See application file for complete search history.

(56) References Cited

U.S. PATENT DOCUMENTS

| | | | |
|---|---|---|---|
| 5,961,190 A * | 10/1999 | Brandmeier | ............ B60T 7/042 303/152 |
| 10,576,953 B2 * | 3/2020 | Strehle | .................. B60T 13/686 |
| 2016/0325719 A1 * | 11/2016 | Linhoff | ..................... B60T 8/92 |

(Continued)

FOREIGN PATENT DOCUMENTS

| | | | |
|---|---|---|---|
| DE | 102009001135 A1 * | 8/2010 | |
| DE | 102009046339 A1 | 5/2011 | |

(Continued)

OTHER PUBLICATIONS

International Search Report for PCT/EP2017/075736, dated Jan. 18, 2018.

*Primary Examiner* — Pamela Rodriguez
(74) *Attorney, Agent, or Firm* — Norton Rose Fulbright US LLP; Gerard Messina

(57) ABSTRACT

In a method for controlling a hydraulic braking system, in the event of a failure of a primary brake actuator system, a secondary brake actuator system is activated.

9 Claims, 2 Drawing Sheets

(56) References Cited

U.S. PATENT DOCUMENTS

| | | | | |
|---|---|---|---|---|
| 2017/0001612 A1* | 1/2017 | Bauer | ............. | B60T 8/4081 |
| 2017/0129468 A1* | 5/2017 | Besier | ............. | B60T 8/4077 |
| 2017/0232948 A1* | 8/2017 | Leiber | ............. | B60T 13/745 |
| | | | | 303/11 |
| 2017/0361825 A1* | 12/2017 | Drumm | ............. | B60T 13/745 |
| 2018/0148031 A1* | 5/2018 | Knechtges | ............. | B60T 13/686 |
| 2019/0126899 A1* | 5/2019 | Strehle | ............. | B60T 8/885 |
| 2019/0344769 A1* | 11/2019 | Zimmermann | ............. | B60T 13/662 |

FOREIGN PATENT DOCUMENTS

| | | |
|---|---|---|
| DE | 102013227066 A1 | 6/2015 |
| DE | 102014220441 A1 | 7/2015 |
| DE | 102014212537 A1 | 12/2015 |
| DE | 102014111594 A1 | 2/2016 |
| DE | 102016201261 A1 | 7/2016 |
| DE | 102015103859 A1 | 9/2016 |
| DE | 102016203111 A1 | 9/2016 |
| DE | 102015206727 A1 | 10/2016 |
| EP | 0780276 A2 | 6/1997 |
| WO | 2015177207 A1 | 11/2015 |
| WO | 2016184616 A1 | 11/2016 |

\* cited by examiner

METHOD FOR CONTROLLING A
HYDRAULIC BRAKING SYSTEM IN A
VEHICLE

FIELD OF THE INVENTION

The present invention relates to a method for controlling a hydraulic braking system in a vehicle, the braking system being equipped with a brake actuator system for generating hydraulic brake pressure at wheel brake units at the front wheels and the rear wheels of the vehicle.

BACKGROUND INFORMATION

A hydraulic braking system in a vehicle including two brake circuits for supplying wheel brake units with hydraulic brake fluid is described in German Published Patent Application No. 10 2009 046 339. The brake circuits are connected to a shared master brake cylinder, from which the brake fluid is conveyed into the brake circuits when the brake pedal is actuated.

A hydraulic pump is located in each brake circuit, the two hydraulic pumps being driven by a shared pump motor. The hydraulic pumps are components of an electronic stability program, via which an independent intervention into the braking system may be carried out. When the hydraulic pumps are activated, brake fluid is conveyed from the master brake cylinder into the brake circuits.

SUMMARY

The method according to the present invention relates to the control of a hydraulic braking system in a vehicle, which is equipped with a primary brake actuator system and a secondary brake actuator system, both the primary and the secondary brake actuator systems being able to be used to generate hydraulic brake pressure at wheel brake units at the front wheels and at the rear wheels of the vehicle. The method may possibly be applied in the case of automated driving, but also in the case of piloted driving. In the regular braking mode—with functional primary brake actuator system—an intervention may be carried out via the primary brake actuator system into the hydraulic braking system to assist the braking procedure or to carry out an independent stabilization process. For this purpose, the brake pressure is modulated via the primary brake actuator system, whereby possibly settable valves are adjusted in one or in multiple wheel brake units at the front wheels and/or at the rear wheels. For example, settable inlet valves may be closed at the wheel brake units at the rear wheels of the vehicle and may be opened at the front wheels of the vehicle to achieve a great braking effect, on the one hand, and to avoid excessive braking of the wheel brake units at the rear wheels and, accompanying this, an unstable vehicle, in particular locking of the rear wheels and/or a yawing movement of the vehicle, on the other hand.

With a functional primary brake actuator system, the secondary brake actuator system, via which the hydraulic brake pressure may also be influenced, is preferably only actuated in addition or not at all. It is thus possible, for example, to use the secondary brake actuator system for brake boosting, for example, via the master brake cylinder, which may be electrically adjusted by the secondary brake actuator system.

In the event of a failure of the primary brake actuator system, the hydraulic brake pressure is modulated via the secondary brake actuator system, to stabilize the vehicle, the inlet valves at the wheel brake units of the rear wheels being designed in such a way that the brake pressure at the wheel brake units of the rear wheels does not exceed a limiting pressure. The activation of the secondary brake actuator system is performed for the purpose of stabilizing the vehicle during a braking procedure.

During the stabilization, in particular the longitudinal stabilization by the secondary brake actuator system, the required brake pressure is actively modulated by the secondary brake actuator system in consideration of stability criteria. The secondary brake actuator system may take over the deceleration and stabilization as long as the driver has not yet resumed control in the case of automated driving. In principle, however, it is also possible that the longitudinal stabilization via the secondary brake actuator system is continued during a driver interaction.

According to one advantageous embodiment, the inlet valves at the rear wheels of the vehicle are closed in the deenergized state, however, they are moved into the open position if a defined differential pressure is exceeded. The inlet valves are not activated in the event of failure of the primary brake actuator system, but rather are advantageously designed at the rear wheels in such a way that they set a defined required differential pressure via the spring tension of a spring element acting thereon. The inlet valves at the rear wheels are thus initially in the closed position in the deenergized state, so that at comparatively low brake pilot pressure, brake force is only generated at the front wheels, and are only moved into the open position at higher brake pilot pressure, so that in addition brake force is also generated at the rear wheels. The inlet valves at the front wheels of the vehicle are advantageously open in the deenergized state.

According to another advantageous embodiment, the inlet valves at the rear wheels of the vehicle are permanently closed in the deenergized state, so that in the event of failure of the primary brake actuator system, brake force is exclusively generated at the front wheels.

According to one advantageous embodiment, the secondary brake actuator system is designed as single-channel and supplies all wheel brake units in the braking system, i.e., both the wheel brake units at the front axle and the wheel brake units at the rear axle, with the same brake pressure. This embodiment has the advantage that comparatively simply constructed secondary brake actuator systems may be used and nonetheless a vehicle stabilization is achieved in the event of a failure of the primary brake actuator system. The modulation of the brake pressure at the wheel brake units of the rear axle is carried out with functional primary brake actuator system via an actuation of the inlet valves at these wheel brake units; while in contrast in the event of a failure of the primary brake actuator system, braking is carried out together with a stable vehicle via the secondary brake actuator system and the inlet valves at the rear axle, which are closed as a function of the differential pressure or are permanently closed.

According to another advantageous embodiment, the primary brake actuator system is an ESP system (electronic stability program), which is designed having at least one hydraulic pump, via which the hydraulic brake pressure in the braking system may be modulated automatically.

The braking system advantageously includes two brake circuits, in each of which two wheel brake units are situated. For this purpose, brake circuits come into consideration which are situated crosswise and thus each include one wheel at the front axle and one wheel diagonally opposed at the rear axle, as well as brake circuits which are axle-related, so that each brake circuit encompasses in each case the two wheel brake units at one vehicle axle.

In the case of an embodiment of the primary brake actuator system as an ESP system, it encompasses in a preferred embodiment a hydraulic pump in each brake circuit. The two hydraulic pumps may possibly be driven via a shared pump motor.

According to still another advantageous embodiment, the secondary brake actuator system is designed as an electromechanical brake booster, which actuates and assists the master brake cylinder in the braking system. The electromechanical brake booster encompasses, for example, an electric motor which actuates the master brake cylinder via a gear unit. In the event of a failure of the primary brake actuator system, the electric motor of the secondary brake actuator system may be activated.

In the event of a failure of the primary brake actuator system, according to a further advantageous embodiment, the inlet valves at the wheel brake units of the front wheels remain in the open position to ensure that the hydraulic brake pressure at the wheel brake units of the front wheels is completely active and a high brake force is generated in these wheel brake units.

According to another advantageous embodiment, in the event of a failure of the primary brake actuator system, the inlet valves at the wheel brake units of the front wheels remain in a more open position than the inlet valves at the wheel brake units of the rear wheels. Accordingly, the inlet valves at the front wheels are opened farther than at the rear wheels and enable a higher brake force at the front wheels than at the rear wheels.

According to still another advantageous embodiment, the error state of the primary brake actuator system is evaluated in an associated control unit, which also generates control signals for activating the secondary brake actuator system. In another advantageous embodiment, the activation of the secondary brake actuator system takes place independently of the activation of the primary brake actuator system.

The present invention furthermore relates to a hydraulic braking system in a vehicle, which is designed to carry out the above-described method and is accordingly equipped with a primary brake actuator system and a secondary brake actuator system for generating hydraulic brake pressure at the wheel brake units of both the front wheels and the rear wheels. Brake pressure is settable via the inlet valves which are associated with the wheel brake units.

Furthermore, the present invention relates to a control unit, using which the settable components of the braking system are activated.

DETAILED DESCRIPTION

Figure 1:
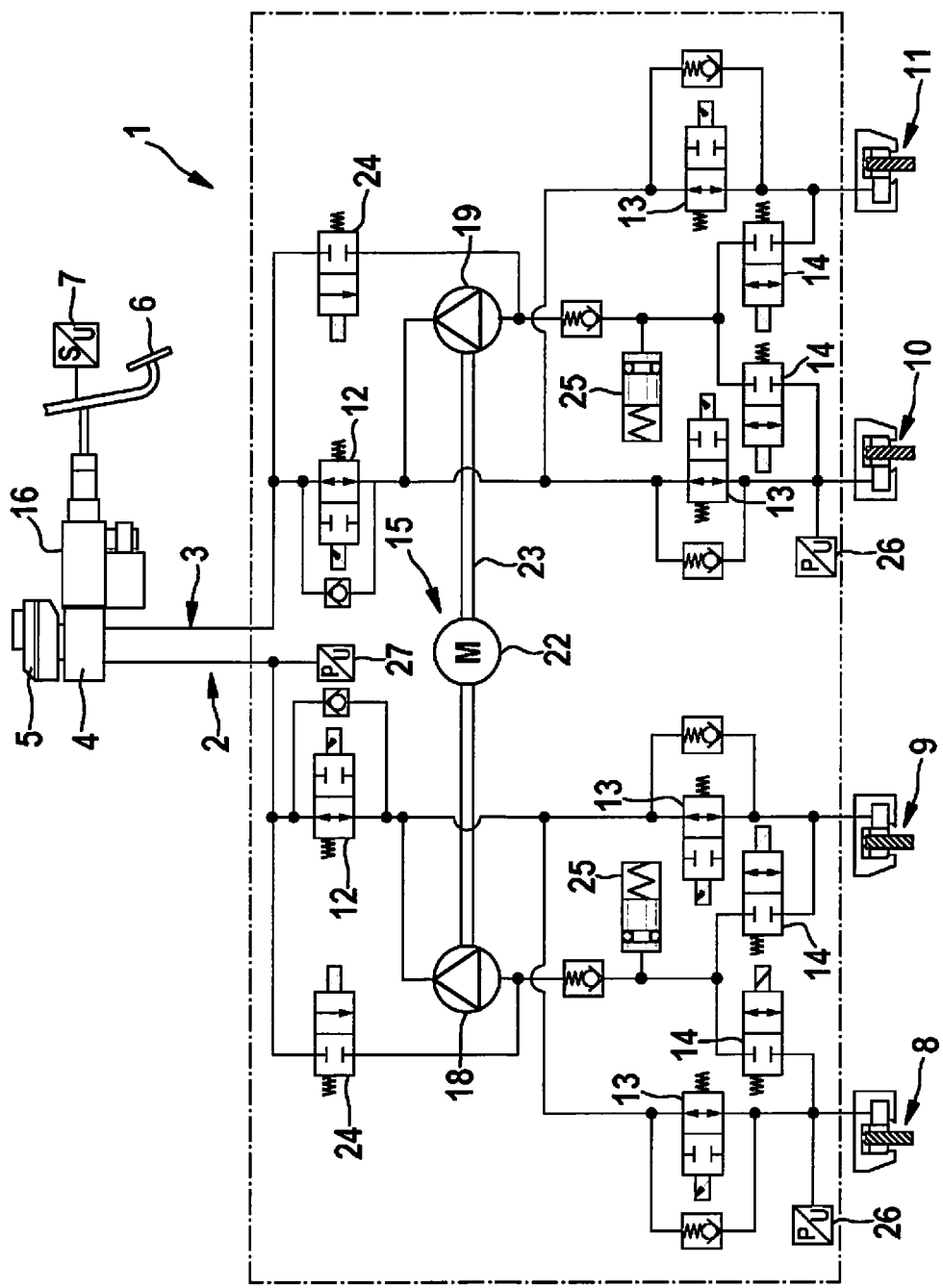
FIG. 1 shows a hydraulic circuit diagram of a vehicle braking system including two brake circuits and a first and a second brake actuator system.

Hydraulic braking system 1 in a vehicle, which is shown in the hydraulic circuit diagram according to FIG. 1, includes two brake circuits 2 and 3 situated crosswise. First brake circuit 2 and second brake circuit 3 are used to supply wheel brake units 8 and 9 at the right rear and front left wheels and 10 and 11 at the front right and rear left wheels with hydraulic brake fluid. The two brake circuits 2, 3 are connected to a shared master brake cylinder 4, which is supplied with brake fluid via a brake fluid reservoir 5. Master brake cylinder 4 is actuated by the driver via brake pedal 6; the pedal travel induced by the driver is measured via a pedal travel sensor 7. An electromechanical brake booster 16, which encompasses an electric motor, for example, which preferably actuates master brake cylinder 4 via a gear unit, is located between brake pedal 6 and master brake cylinder 4.

In each brake circuit 2, 3 a switching valve 12 is situated, which is located in the flow path between the master brake cylinder and particular wheel brake units 8 and 9 and 10 and 11. Switching valves 12 are open in their deenergized normal position. A check valve associated with each switching valve 12 is connected in parallel, which may have a flow through it in the direction of the particular wheel brake units.

Inlet valves 13, with which check valves are associated, which may have a flow through them in the opposite direction, i.e., from the wheel brake units in the direction toward the master brake cylinder, are located between switching valves 12 and particular wheel brake units 8, 9 and 10, 11. Inlet valves 13 at the front wheels of the vehicle are open when deenergized, inlet valves 13 at the rear wheels of the vehicle are closed in the deenergized state; however, they are moved into the open position if a defined differential pressure is exceeded (closed when deenergized depending on the differential pressure).

One outlet valve 14, which is closed when deenergized, is associated with each wheel brake unit 8, 9 and 10, 11. Outlet valves 14 are each connected to the suction side of a pump unit 15, which includes a pump 18 and 19 in each brake circuit 2, 3. A shared electric drive or pump motor 22, which actuates both pumps 18 and 19 via a shaft 23, is associated with the pump unit. The pressure side of pumps 18 and 19 is connected to one line section between switching valve 12 and the two inlet valves 13 per brake circuit.

The suction sides of pumps 18 and 19 are each connected to a main or high-pressure switching valve 24, which is hydraulically connected to master brake cylinder 4. During a driving-dynamics control intervention, main switching valves 24, which are closed in the deenergized state, may be opened for a rapid brake pressure buildup, so that pumps 18 and 19 take in hydraulic fluid directly from master brake cylinder 4. This brake pressure buildup may be carried out independently of an actuation of the braking system by the driver. Pump unit 15 including the two individual pumps 18 and 19, electric pump motor 22, and shaft 23 is associated with a driver assistance system and forms an electronic stability program (ESP system), which is activated in particular for vehicle stabilization.

One hydraulic accumulator 25, which is used for the temporary storage of brake fluid which is discharged during a driving-dynamics intervention through outlet valves 14 from wheel brake units 8, 9 and 10, 11, is located between outlet valves 14 and the suction side of pumps 18 and 19 per brake circuit 2, 3. One check valve, which opens in the direction of the suction sides of pumps 18, 19, is associated with each hydraulic accumulator 25.

A pressure sensor 26 is located in each brake circuit 2, 3 in the area of each of wheel brake units 8, 9 and 10, 11 for pressure measurement. A further pressure sensor 27 is situated in brake circuit 2 adjacent to master brake cylinder 4.

The ESP system including pump unit 15 forms a primary brake actuator system for driver-independent generation of hydraulic brake pressure at the wheel brake units in both brake circuits 2, 3. The ESP system is used for vehicle stabilization by activating various valves in the braking system and pumps 18, 19 in such a way that locking of the vehicle wheels is prevented.

In the event of a failure of the ESP system, for example, in the event of a failure of electric drive motor 22 of pump unit 15, the stabilization function may be taken over by electromechanical brake booster 16, which forms a secondary brake actuator system in particular in the case of automated driving. Under defined conditions, electromechanical brake booster 16 may be used for the automatic modulation of the brake pressure in the brake circuits with the goal of vehicle stabilization.

Figure 2:
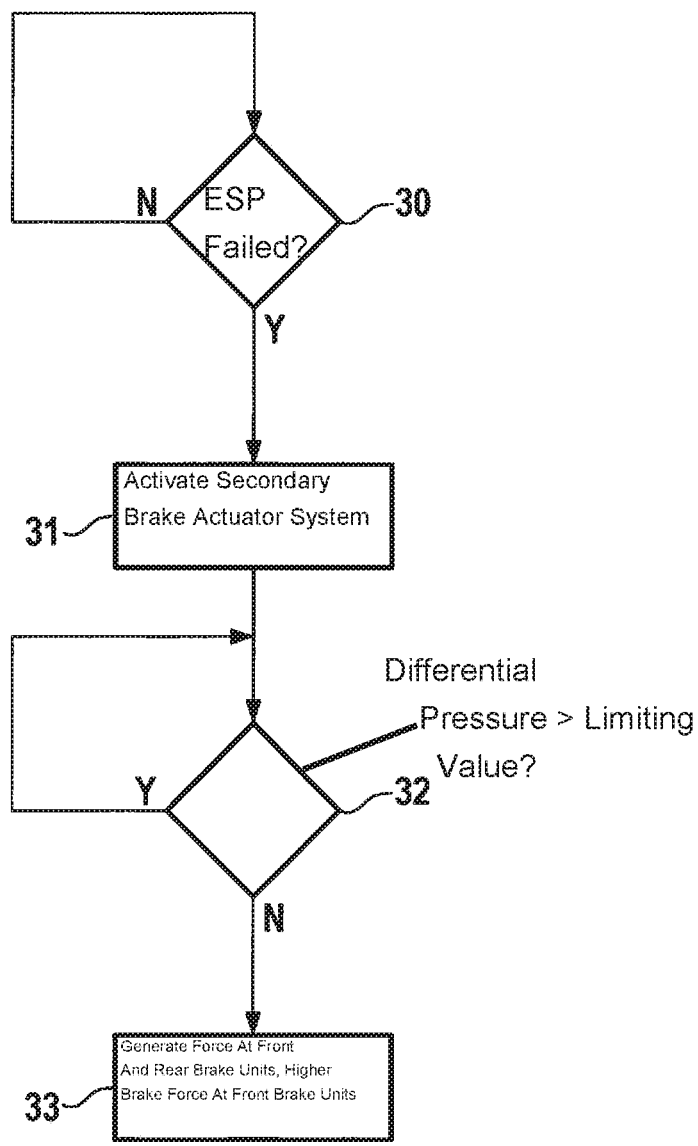
FIG. 2 shows a flow chart having method steps for vehicle stabilization in the event of a failure of an ESP system.

FIG. 2 shows a flow chart having individual method steps for vehicle stabilization in the event of a failure of the ESP system.

It is initially checked in first method step 30 whether the ESP system has failed. If this is not the case, the primary brake actuator system may be used further without restriction, in particular also during automated driving. In this case, following the no branch ("N"), the sequence returns back to the beginning of method step 30 and the query is carried out in method step 30 again at regular intervals.

In contrast, if the check in step 30 has the result that there is a failure of the ESP system, the sequence advances following the yes branch ("Y") to next step 31, in which the secondary brake actuator system is activated, which is the electromechanical brake booster, which is used during automated driving for the automatic modulation of the brake pressure with the goal of vehicle stabilization in the case of the failure of the primary brake actuator system.

The inlet valves are in their deenergized state because of the failure of the ESP system. Accordingly, the inlet valves are open in the wheel brake units at the front axle and are closed in the wheel brake units at the rear axle. Because of the design as differential pressure-dependent valves which are closed when deenergized, the inlet valves at the rear axle may also be moved into the open position, however, as soon as the applied brake pressure exceeds a defined differential pressure. In this way, it is ensured that the vehicle drives stably during the automatic braking even in the event of a failure of the primary brake actuator system.

In following method step 32, it is checked whether the differential pressure at the inlet valves at the rear axle exceeds a defined differential pressure limiting value. If this is not the case, the inlet valves at the rear axle remain closed, so that no brake force is generated at the wheel brake units at the rear axle. The inlet valves at the rear axle are automatically opened only upon exceeding the differential pressure limiting value, and the sequence advances, following the yes branch, to next method step 33, which represents generation of brake force both at the wheel brake units of the front axle and at the rear brake units of the rear axle, where a higher brake force is generated at the wheel brake units at the front axle than at the rear axle.

The inlet valves at the rear axle act as passive modules in the deenergized state, the differential pressure limiting value being determined by the force of a spring element in the inlet valves at the rear axle. Accordingly, the opening of the inlet valves at the rear axle takes place without actuation of these inlet valves automatically, solely upon exceedance of the differential brake pressure limiting value.

What is claimed is:

1. A method for controlling a hydraulic braking system in a vehicle that includes a primary brake actuator system and a secondary brake actuator system for generating hydraulic brake pressure at wheel brake units at front wheels and at rear wheels of the vehicle, the method comprising:
   setting the brake pressure in the wheel brake units via settable inlet valves; and
   when a failure of the primary brake actuator system occurs, generating the brake pressure via the secondary brake actuator system, wherein the primary brake actuator system includes an ESP (electronic stability program) system including a hydraulic pump and a first motor, and the secondary brake actuator system includes an electromechanical brake booster that actuates a master brake cylinder in the braking system, the electromechanical brake booster including a second motor separate from the first motor.

2. The method as recited in claim 1, wherein the inlet valves at the rear wheels of the vehicle are closed when the inlet valves are in a deenergized state, the method further comprising moving the inlet valves into an open position when a defined differential pressure is exceeded.

3. The method as recited in claim 1, wherein the secondary brake actuator system has a one-channel design and supplies all of the wheel brake units with the same brake pressure.

4. The method as recited in claim 1, wherein the inlet valves at the wheel brake units of the front wheels are open when deenergized.

5. The method as recited in claim 1, wherein the inlet valves at the wheel brake units of the front wheels remain in an open position when a failure occurs in the primary brake actuator system and brake pressure generation by the secondary brake actuator system.

6. The method as recited in claim 1, wherein the inlet valves at the wheel brake units of the front wheels remain in a more open position than the inlet valves at the wheel brake units of the rear wheels when a failure occurs in the primary brake actuator system and brake pressure generation by the secondary brake actuator system.

7. The method as recited in claim 1, further comprising:
   evaluating an error state of the primary brake actuator system in an associated control unit; and
   activating the secondary brake actuator system by the control unit.

8. A hydraulic braking system in a vehicle, comprising:
   a primary brake actuator system, wherein the primary brake actuator system includes an ESP (electronic stability program) system including a hydraulic pump and a first motor; and
   a secondary brake actuator system, the primary brake actuator system and the secondary brake actuator system generating a hydraulic brake pressure at wheel brake units at front wheels and at rear wheels of the vehicle, wherein the secondary brake actuator system includes an electromechanical brake booster that actuates a master brake cylinder in the braking system, the electromechanical brake booster including a second motor separate from the first motor, and wherein:
   the brake pressure is set in the wheel brake units via settable inlet valves, and
   when a failure of the primary brake actuator system occurs, the brake pressure is generated via the secondary brake actuator system.

9. A control unit for controlling settable components of a braking system, the braking system comprising:
   a primary brake actuator system, wherein the primary brake actuator system includes an ESP (electronic stability program) system including a hydraulic pump and a first motor; and
   a secondary brake actuator system, the primary brake actuator system and the secondary brake actuator system generating a hydraulic brake pressure at wheel brake units at front wheels and at rear wheels of the vehicle, wherein the secondary brake actuator system includes an electromechanical brake booster that actuates a master brake cylinder in the braking system, the electromechanical brake booster including a second motor separate from the first motor, and wherein:

the brake pressure is set in the wheel brake units via settable inlet valves, and when a failure of the primary brake actuator system occurs, the brake pressure is generated via the secondary brake actuator system.

\* \* \* \* \*